United States Patent
Ootake et al.

(10) Patent No.: US 8,176,728 B2
(45) Date of Patent: *May 15, 2012

(54) AIR-FUEL RATIO CONTROL DEVICE

(75) Inventors: Yoshiyuki Ootake, Yokohama (JP); Yasuji Ishizuka, Chigasaki (JP); Masaki Koga, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 920 days.

This patent is subject to a terminal disclaimer.

(21) Appl. No.: 12/183,495

(22) Filed: Jul. 31, 2008

(65) Prior Publication Data

US 2009/0043481 A1    Feb. 12, 2009

(30) Foreign Application Priority Data

Aug. 9, 2007   (JP) ................................. 2007-207780

(51) Int. Cl.
*F01N 3/20* (2006.01)
(52) U.S. Cl. ................ 60/285; 60/284; 60/287; 60/302; 60/309
(58) Field of Classification Search .................... 60/284, 60/285, 287, 302, 309; 123/568.21; 701/103
See application file for complete search history.

(56) References Cited

U.S. PATENT DOCUMENTS

| | | | |
|---|---|---|---|
| 6,003,309 A * | 12/1999 | Agustin et al. | 60/276 |
| 6,192,675 B1 * | 2/2001 | Hirota et al. | 60/286 |
| 7,536,999 B2 * | 5/2009 | Ootake et al. | 123/568.21 |
| 2003/0029163 A1 * | 2/2003 | Tamura et al. | 60/285 |
| 2006/0225408 A1 * | 10/2006 | Inoue et al. | 60/288 |
| 2006/0236682 A1 * | 10/2006 | I et al. | 60/288 |
| 2007/0125067 A1 * | 6/2007 | I et al. | 60/277 |
| 2007/0271907 A1 * | 11/2007 | Yamana et al. | 60/285 |
| 2008/0172166 A1 * | 7/2008 | Nagai et al. | 701/103 |
| 2008/0209900 A1 * | 9/2008 | Demura et al. | 60/324 |

FOREIGN PATENT DOCUMENTS

EP    1 152 133 A2    11/2001

(Continued)

OTHER PUBLICATIONS

JP 03233123A Translation.*

*Primary Examiner* — Kenneth Bomberg
*Assistant Examiner* — Brandon Lee
(74) *Attorney, Agent, or Firm* — Drinker Biddle & Reath LLP

(57) ABSTRACT

An air-fuel ratio control device is provided for controlling the air-fuel ratio of an engine. The device includes an exhaust passage having a main catalytic converter and a bypass passage having a bypass catalytic converter, the bypass passage diverging from the exhaust passage at an upstream junction and rejoining the exhaust passage at a downstream junction. A valve mechanism disposed in the exhaust passage between the upstream junction and the downstream junction moves between a closed state and an open state. During a predetermined period of time after the valve mechanism opens to permit flow in the exhaust passage, the air-fuel ratio of the engine is controlled based on a signal from a first air-fuel ratio sensor in the bypass passage using a low response correction value that is less than a normal response correction value that would be used when the valve mechanism is closed.

11 Claims, 10 Drawing Sheets

FOREIGN PATENT DOCUMENTS

| | | | |
|---|---|---|---|
| EP | 1 188 909 A2 | 3/2002 | |
| EP | 1 715 152 A1 | 10/2006 | |
| EP | 1 835 140 A2 | 9/2007 | |
| EP | 1 956 208 A2 | 8/2008 | |
| GB | 2 423 338 | 8/2006 | |
| JP | 03233123 A | * | 10/1991 |
| JP | 5-321644 | 12/1993 | |
| JP | 09-014024 | 1/1997 | |
| JP | 10-047133 | 2/1998 | |
| JP | 2000265827 A | * | 9/2000 |
| JP | 2001-115879 | 4/2001 | |
| JP | 2005-207270 | 8/2005 | |
| JP | 2005-337239 | 12/2005 | |

* cited by examiner

AIR-FUEL RATIO CONTROL DEVICE

CROSS-REFERENCE TO RELATED APPLICATIONS

This application claims priority to Japanese Patent Application No. 2007-207780 filed Aug. 9, 2007, which is incorporated by reference herein in the entirety.

BACKGROUND OF THE INVENTION

1. Field of the Invention

The present invention relates to an air-fuel ratio control device for controlling the air-fuel ratio of an engine.

2. Description of Related Art

The use of a catalytic converter to reduce toxic emissions expelled in the exhaust of a motor vehicle engine is well known. Conventionally, a catalytic converter is located in an exhaust passage of the vehicle, the exhaust passage conveying exhaust downstream away from the engine. If the catalytic converter is disposed in the exhaust passage at a distance away from the engine, it takes a significant time for the catalyst within the catalytic converter to be activated sufficiently by the heat of the exhaust to effectively purify the exhaust. However, if the catalytic converter is disposed in the exhaust passage near the engine, the durability of the catalyst is degraded by too much heat.

Previous systems have attempted to solve these problems by using a main catalytic converter disposed in a main exhaust passage, combined with a bypass catalytic converter disposed in a bypass passage in parallel with a portion of the main passage. The bypass passage branches away from and rejoins the main passage upstream of the main catalytic converter. A switching valve disposed in the main passage upstream of the main catalytic converter directs exhaust through the main or bypass passages. Disposed in the main passage downstream of the switching valve is a main air-fuel ratio sensor having a heated sensor element, the main air-fuel ratio sensor providing a signal based upon which the air-fuel ratio of the engine can be controlled. Until the main catalytic converter is activated, the switching valve closes the main passage so that exhaust flows in the bypass passage. This makes it possible for exhaust flowing in the bypass passage to be purified by the bypass catalytic converter, which is activated earlier than the main catalytic converter, thus improving the efficiency and preventing the degradation of purification of the exhaust.

While the switching valve is closed, blocking exhaust flow in the main passage, some exhaust from the engine may linger in a deadheaded portion the main passage upstream of the switching valve. The lingering gas cools so that the temperature of the lingering gas becomes lower than that of exhaust immediately after expulsion from the engine. As the lingering gas is cooled, moisture in the lingering gas condenses. If this moisture flows downstream during the opening of the switching valve and contacts the main air-fuel ratio sensor disposed downstream in the main passage, the air-fuel ratio sensor is suddenly cooled and the heated sensor element may crack or be otherwise damaged. Therefore, until the moisture in lingering gas has passed the main air-fuel ratio sensor disposed in the main passage, the air-fuel ratio is controlled based on a value detected by a bypass air-fuel sensor disposed in the bypass passage. After the moisture has passed beyond the main air-fuel ratio sensor, the main air-fuel ratio sensor element is heated to an activating temperature, and the air-fuel ratio is controlled based on a value detected by the main air-fuel ratio sensor. Thus, cracking of the sensor element of the main air-fuel ratio sensor is prevented.

However, when the switching valve opens, most of the exhaust expelled from the engine flows through the main passage, the main passage having a larger cross-sectional area than the bypass passage. As a result, the exhaust flow rate in the bypass passage is decreased, so that the quantity of exhaust flowing to the bypass air-fuel ratio sensor becomes insufficient and hence the responsiveness of the bypass air-fuel ratio sensor disposed in the bypass passage decreases. In particular, at low flow rates, the bypass air-fuel ratio sensor lags in detecting changes in the actual air-fuel ratio of the engine. Accordingly, while awaiting passage of the moisture beyond the main air-fuel ratio sensor after the switching valve opens, controlling the air-fuel ratio of the engine based on the value detected by the bypass air-fuel ratio sensor may cause more changes than necessary to the air-fuel ratio. As a result, purification of the exhaust may be poor during this time period.

In sum, when the bypass air-fuel ratio sensor is used while the switching valve is open, most of the exhaust flows through the main passage, resulting in a decreased quantity of exhaust flow to the bypass air-fuel ratio sensor, and hence a lag in the responsiveness of the bypass air-fuel sensor. In this situation, the air-fuel ratio control based on the bypass air-fuel ratio sensor may be poor, leading to deterioration in emission purification.

BRIEF SUMMARY OF THE INVENTION

It is accordingly an object of the present invention to provide an air-fuel ratio control device that reduces deterioration in exhaust purification when the switching valve is open and air-fuel ratio control is exerted using an air-fuel ratio sensor disposed in the bypass passage of an exhaust system.

In an embodiment, the invention provides an air-fuel ratio control device for controlling the air-fuel ratio of an engine. The device includes an exhaust passage for conveying exhaust flow in a downstream direction away from the engine and a bypass passage diverging from the exhaust passage at an upstream junction and rejoining the exhaust passage at a downstream junction located downstream from the upstream junction. A bypass catalytic converter is disposed in the bypass passage and a main catalytic converter is disposed in the exhaust passage downstream from the downstream junction. A valve mechanism is disposed in the exhaust passage between the upstream junction and the downstream junction, the valve mechanism moving between a closed state and an open state. A control circuit is programmed to control the air-fuel ratio. During a closed period of the valve mechanism, the air-fuel ratio is controlled based on a signal from a first air-fuel ratio sensor disposed in the bypass passage. During an open period of the valve mechanism, the air-fuel ratio is controlled based on one of a signal from the first air-fuel ratio sensor and a signal from a second air-fuel ratio sensor disposed in the exhaust passage downstream of the valve mechanism. When the air-fuel ratio is controlled based on a signal from the first air-fuel ratio sensor during the open period of the valve mechanism, the control circuit makes an amount of adjustment less than would be made based on the same signal from the first air-fuel ratio sensor during the closed period of the valve mechanism.

In another embodiment, the invention provides an air-fuel ratio control device for controlling the air-fuel ratio of an engine. The device includes an exhaust passage for conveying exhaust flow in a downstream direction away from the engine and a bypass passage diverging from the exhaust passage at an upstream junction and rejoining the exhaust passage at a downstream junction located downstream from the upstream junction. A bypass catalytic converter is disposed in the bypass passage and a main catalytic converter is disposed in the exhaust passage downstream from the downstream junction. A valve mechanism is disposed in the exhaust passage between the upstream junction and the downstream junction for apportioning the exhaust flow between the exhaust passage and the bypass passage. A control circuit is programmed to control the air-fuel ratio. During a closed period of the valve mechanism, the air-fuel ratio is controlled based on a signal from a first air-fuel ratio sensor disposed in the bypass passage. During an open period of the valve mechanism, the air-fuel ratio is controlled based on a signal from a second air-fuel ratio sensor disposed in the exhaust passage downstream of the valve mechanism. During a predetermined period during which the valve mechanism is in a partially open state before moving to the open state, the air-fuel ratio is controlled based on a signal from the first air-fuel ratio sensor. The predetermined period is the time it would take for moisture in gas lingering upstream of the valve mechanism to wet and crack an element of the second air-fuel ratio sensor after the valve mechanism switches from the closed state to the open state.

In still another embodiment, the invention provides a method for controlling the air-fuel ratio of an engine. The method includes apportioning exhaust flow from the engine between an exhaust passage and a bypass passage using a valve mechanism moving between a closed state and an open state. The valve mechanism is disposed between an upstream junction and a downstream junction in the exhaust passage, and the bypass passage diverges from the exhaust passage at the upstream junction and rejoins the exhaust passage at the downstream junction. The method further includes controlling the air-fuel ratio based on a signal from a first air-fuel sensor disposed in the bypass passage, during a closed period of the valve mechanism when at least most of the exhaust flow is directed through a bypass catalytic converter disposed in the bypass passage. The method still further includes controlling the air-fuel ratio based on one of a signal from the first air-fuel sensor and a signal from a second air-fuel sensor disposed in the exhaust passage downstream of the valve mechanism, during an open period of the valve mechanism when at least most of the exhaust flow is permitted through the exhaust passage, the exhaust flow flowing through a main catalytic converter disposed in the exhaust passage downstream of the downstream junction. The method yet further includes making an amount of adjustment when the air-fuel ratio is controlled based on a signal from the first air-fuel sensor during the open period of the valve mechanism less than would be made based on the same signal from the first air-fuel ratio sensor during the closed period of the valve mechanism.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Figure 1:
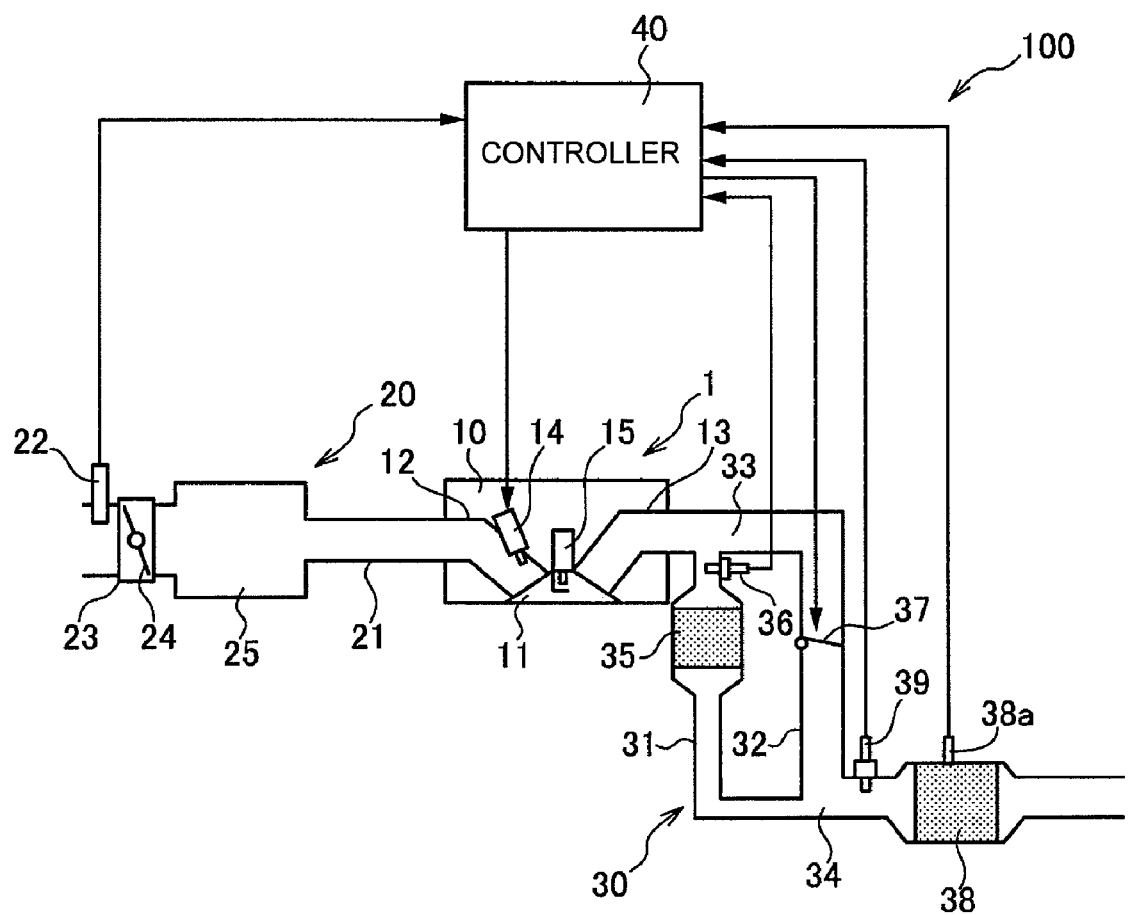
FIG. 1 is a schematic diagram showing an embodiment of an engine emission control system.

A first embodiment of the present invention will hereinafter be described with reference to the accompanying drawings. FIG. 1 is a schematic diagram showing a basic configuration of an air-fuel control device 100 for controlling the air-fuel ratio of an engine 1. The air-fuel control device 100 includes the engine 1, an intake system 20 that provides intake air flow into the engine 1, and an exhaust system 30 that conducts exhaust flow away from the engine 1.

The engine 1 has a cylinder head 10, in which are formed an intake port 12 for the passage of intake air from the outside to the cylinder head 10, and an exhaust port 13 for the passage of exhaust from the engine 1. Defined in the cylinder head 10 by a piston (not shown) and cylinder wall (not shown) is a combustion chamber 11 where fuel is burned. A fuel injection valve 14 and an ignition plug 15 are disposed on the cylinder head 10. The fuel injection valve 14 is disposed so that its injection opening extends into the intake port 12. The fuel injection valve 14 injects fuel into the intake port 12 according to the operating state of a vehicle. The ignition plug 15 is mounted on the cylinder head 10 on the top side of the chamber 11 such that an ignition part of the plug 15 extends into the combustion chamber 11. The ignition plug 15 produces a spark at a predetermined time, thereby igniting a mixture of air and fuel in the combustion chamber 11.

An intake passage 21 of the intake system 20 is connected to the intake port 12 of the cylinder head 10. The intake passage 21 includes, in order from upstream to downstream, an air flow meter 22, a throttle chamber 23, and an intake manifold 25. The air flow meter 22 is attached upstream of the throttle chamber 23 in air intake passage 21. The air flow meter 22 measures the quantity of fresh air taken into the engine from outside. The throttle chamber 23 is disposed in the intake passage 21 downstream of the air flow meter 22. The throttle chamber 23 includes a throttle valve 24 for controlling the quantity of intake air. The intake manifold 25 is disposed in the intake passage 21 downstream of the throttle chamber 23, and temporarily stores intake air that has flowed from upstream.

Connected to the exhaust port 13 of the cylinder head 10 is a main exhaust passage 32 of the exhaust system 30. The exhaust system 30 further includes a bypass passage 31 disposed to permit exhaust flow parallel with a portion of the main passage 32. The bypass passage 31 is smaller in diameter than the main passage 32 and therefore has a smaller flow capacity than the main passage 32. The bypass passage 31 diverges from the main passage 32 at an upstream junction 33 and rejoins the main passage 32 at a downstream junction 34 located downstream from the upstream junction 33.

A main catalytic converter 38 is disposed in the main passage 32 downstream of the downstream junction 34 where the bypass passage 31 rejoins the main passage 32. The main catalytic converter 38 typically comprises a three-way catalyst. The main catalytic converter 38 purifies exhaust flowing in the main passage 32. Attached to the main catalytic converter 38 is a catalyst temperature sensor 38a for measuring the catalyst temperature to determine when the catalyst in the main catalytic converter 38 has reach a main catalyst activation temperature.

The bypass passage 31 includes a bypass catalytic converter 35 and a first or bypass air-fuel ratio sensor 36. The terms "first air-fuel ratio sensor" and "bypass air-fuel ratio sensor" are used interchangeably herein, and are sometimes abbreviated as "first sensor" and "bypass sensor," respectively The bypass catalytic converter 35 is disposed near the upstream junction 33 and thus near the engine 1 so as to be activated quickly after the engine begins expelling exhaust. The bypass catalytic converter 35 is smaller in capacity than the main catalytic converter 38 and excels in low-temperature activity. The main catalytic converter 38 is intended to purify the exhaust during normal operation of the engine and when the exhaust system 30 is heated above the main catalyst activation temperature, while the bypass catalytic converter 35 is intended to purify the exhaust during startup of the engine and when the exhaust system 30 is not heated above the main catalyst activation temperature.

The first air-fuel ratio sensor 36 is disposed in the bypass passage 31 upstream of the bypass catalytic converter 35. The first air-fuel ratio sensor 36 detects the oxygen concentration of exhaust flowing in the bypass passage 31. The first sensor 36 has a sensor element (not shown) that is heated by a heater (not shown) and maintained within a range of operating temperatures.

The main passage 32 includes a switching valve 37, the main catalytic converter 38, and a second or main air-fuel ratio sensor 39. The terms "second air-fuel ratio sensor" and "main air-fuel ratio sensor" are used interchangeably herein, and are sometimes abbreviated as "second sensor" and "main sensor," respectively. The switching valve 37 is disposed between the upstream junction 33 and the downstream junction 34 in the main passage 32. The switching valve 37 opens or closes the main passage 32 according to the temperature of the catalyst in the main catalytic converter 38 as sensed by the temperature sensor 38a, thereby switching the passage conveying exhaust expelled from the engine 1. In particular, when the switching valve 37 is closed, the exhaust flow is directed through the bypass passage 31, while when the switching valve 37 is opened, most of the exhaust flow is permitted through the main passage 32, with a small amount still flowing through the bypass passage 31. The relative amounts of flow in the bypass passage 31 and the main passage 32 can be apportioned by the switching valve 37 being partially open.

The main passage 32 is larger in diameter than the bypass passage 31. Therefore, the main passage 32 has less pressure drop and permits a higher flow rate of exhaust than the bypass passage 31. Accordingly, as long as the main catalytic converter can efficiently purify the exhaust expelled from the engine, it is preferable for the switching valve 37 to be open to allow the maximum amount of exhaust to flow through the main passage 32 with the least back pressure on the engine 1.

The second air-fuel ratio sensor 39 is disposed in the main passage 32 between the downstream junction 34 and the main catalytic converter 38. The second air-fuel ratio sensor 39 measures the oxygen concentration of exhaust flowing in the main passage 32. Like the first air-fuel ratio sensor 36, the second air-fuel ratio sensor 39 has a sensor element (not shown) that is heated by a heater (not shown) and maintained within a range of operating temperatures.

A controller 40, which controls the switching valve 37 and the air-fuel ratio of the engine 1, includes a CPU, ROM, RAM, and I/O interface. The controller 40 receives signals output by various sensors, such as the air flow meter 22, the main catalyst temperature sensor 38a, the first air-fuel ratio sensor 36, and the second air-fuel ratio sensor 39, all of which monitor the operating state of the vehicle engine. The controller 40 controls the degree of opening of the switching valve 37, including fully open, closed, or a degree of partially open between closed and fully open. The controller 40 opens or closes the switching valve 37 based on the temperature of the main catalytic converter 38, thereby apportioning exhaust flow between the main passage 32 and the bypass passage 31. In addition, based on signals from the second air-fuel ratio sensor 39 and the first air-fuel ratio sensor 36, the controller 40 corrects the quantity of fuel injected by the fuel injection valve 14, and thus adjusts the air-fuel ratio of the engine 1. Alternatively, the controller 40 can adjust the air-fuel ratio of the engine 1 by adjusting the throttle valve 24 rather than, or in combination with, the fuel injection valve 14.

Air drawn from outside flows into the intake collector 25 of the engine 1 at a flow rate controlled by the throttle valve 24. The intake air and fuel injected from the fuel injection valve 14 are combined to form an air-fuel mixture, which is introduced into the combustion chamber 11 through the intake port 12. The air-fuel mixture introduced is ignited by the ignition plug 15 and burns in the combustion chamber 11. The burned gases produced by burning the air-fuel mixture are forced out through the exhaust port 13 of the cylinder head 10 as exhaust.

Figure 2:
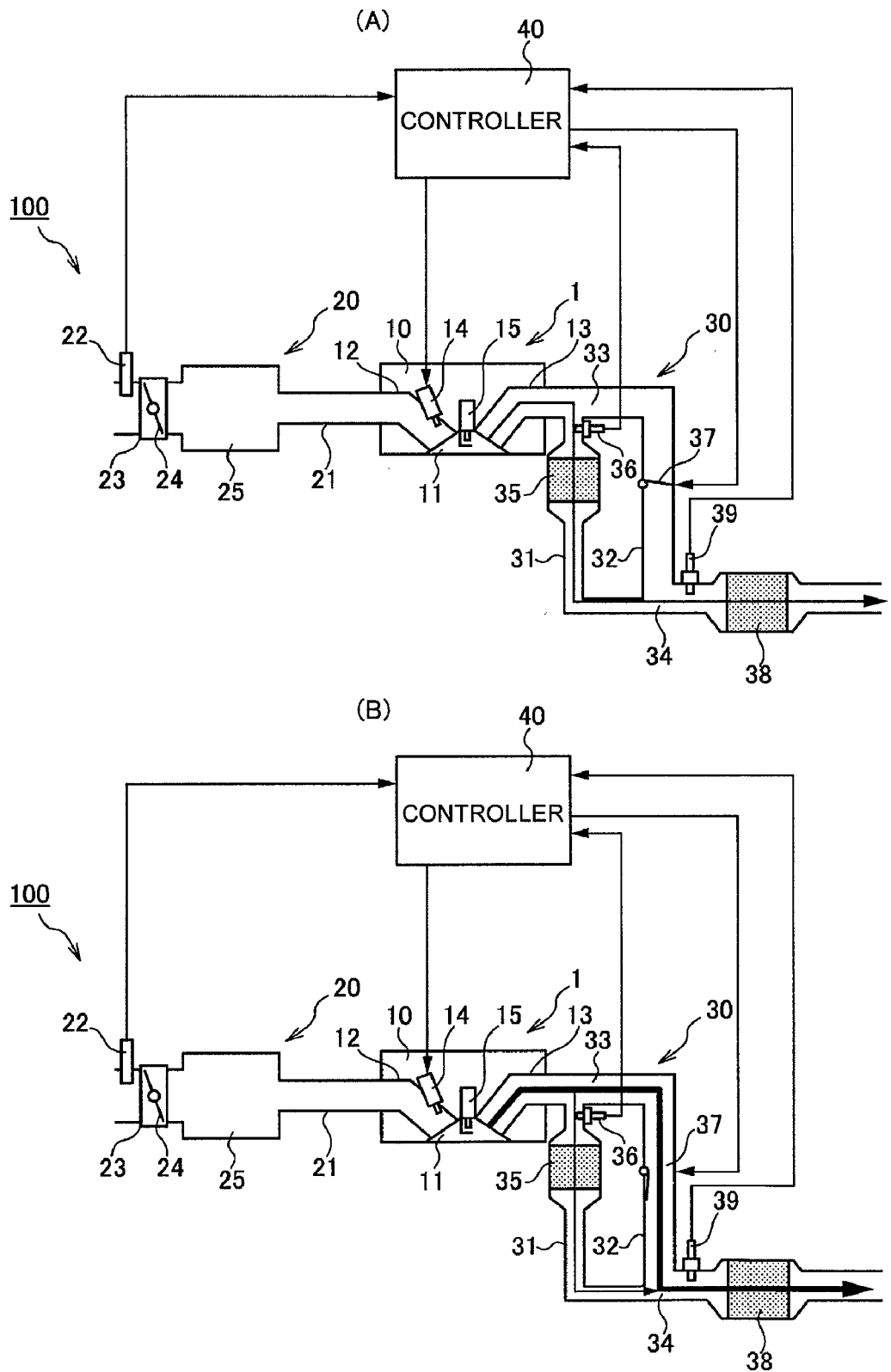
FIGS. 2A and 2B are schematic diagrams showing exhaust flow through the emission control system of FIG. 1 with the switching valve closed and open, respectively.

The operation of a conventional air-fuel ratio control system during the opening or closing of the switching valve 37 will now be described with reference to FIGS. 2A to 4C. FIGS. 2A and 2B are schematic diagrams of showing the flow of exhaust expelled into the exhaust port 13 from the engine 1. In FIG. 2A, the switching valve 37 is fully closed, blocking exhaust flow from the main passage 32 and thus forcing the exhaust flow through the bypass passage 31. In FIG. 2B, the switching valve 37 is fully open, permitting the maximum amount of exhaust flow through the main passage 32 while still allowing an amount of exhaust flow through the bypass passage 31. An arrow in each of the drawings indicates the direction of exhaust flow in each passage 31 and 32, and the thickness of the arrow represents the magnitude of the exhaust flow rate in each passage 31 and 32.

When the engine temperature or exhaust temperature is low, for example when the engine is first started, the main catalytic converter 38 is not sufficiently hot to be activated immediately. Therefore, the switching valve 37 closes the main passage 32, as shown in FIG. 2A. Most the exhaust forced out of the engine 1 flows into the bypass passage 31 at the upstream junction 33 and is purified by the bypass catalytic converter 35. The bypass catalytic converter 35 is located near the engine 1, and hence is activated quickly, allowing purification of exhaust at an early stage of engine operation. The exhaust purified by the bypass catalytic converter 35 flows downstream through the bypass passage 31, then into the main passage 32 at the downstream junction 34, and is ultimately emitted from the exhaust system 30.

Thus, when the switching valve 37 is fully closed, most, if not all, of the exhaust flows in the bypass passage 31. Accordingly the first air-fuel ratio sensor 36 disposed in the bypass passage 31 is used to detect the oxygen concentration of exhaust flowing in the bypass passage 31. Based on the value detected by the first sensor 36, the controller 40 corrects the quantity of injected fuel, thereby adjusting the air-fuel ratio of the engine 1.

When the main catalytic converter 38 is heated by exhaust from the engine 1 and hence is activated, the switching valve 37 opens the main passage 32, as shown in FIG. 2B. Once the switching valve 37 is fully opened, most the exhaust expelled from the engine 1 flows into the main passage 32. Although some of the exhaust may flow into the bypass passage 31, the bypass passage 31 has a smaller cross-sectional area than the main passage 32. Therefore, the bypass passage 31 allows a lower flow rate of exhaust than in the main passage 32. The exhaust that has flowed through either the main passage 32 or bypass passage 31 is purified by the main catalytic converter 38 and then emitted from the exhaust system 30.

Thus, when the switching valve 37 is fully open, the flow rate of the exhaust flowing in the main passage 32 is greater than that in the bypass passage 31. Accordingly, the controller 40 uses a signal from the second air-fuel ratio sensor 39 disposed in the main passage 32, rather than a signal from the first air-fuel ratio sensor 36 disposed in the bypass passage 31, to accurately detect the oxygen concentration of the exhaust. Based on the value detected by the second sensor 39, the controller 40 corrects the quantity of fuel to be injected, thereby adjusting the air-fuel ratio of the engine 1.

While the main passage 32 is closed by the switching valve 37, some exhaust gas lingers in the main passage 32 between the upstream junction 33 and the switching valve 37. The lingering exhaust gas cools, and as it cools, moisture in the lingering gas condenses. The moisture adheres to the switching valve 37 and/or to the main passage 32 upstream of the switching valve 37. When the switching valve 37 opens, the moisture flows downstream and contacts the second air-fuel ratio sensor 39. If the second sensor 39 is in use such that its sensor element has been heated to an activating temperature, the moisture can cause sudden cooling, and thus cracking or other damage to the sensor element. If the second air-fuel ratio sensor 39 is damaged, the controller 40 can no longer control the air-fuel ratio of the engine 1 based on its signal, and the second sensor 39 must be replaced or repaired. Therefore, while the moisture is passing beyond the second air-fuel ratio sensor 39, the air-fuel ratio is controlled based on the value detected by the first air-fuel ratio sensor 36. After sufficient time has elapsed for the moisture to pass, the second sensor 39 is heated to the activating temperature, and the air-fuel ratio is controlled based upon the value measured by the second sensor 39. By not heating the second air-fuel ratio sensor 39 until after the moisture from the lingering gas has passed, the sensor element of the second sensor 39 is protected from damage.

Figure 3:
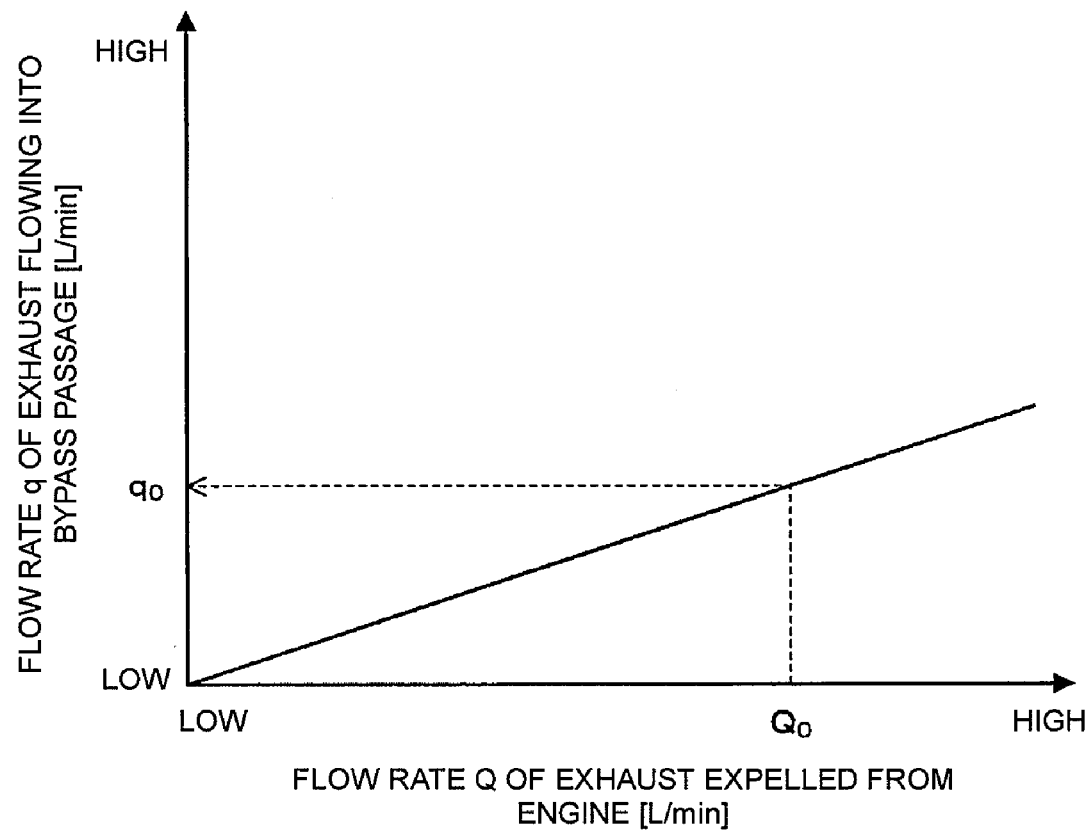
FIG. 3 is a graph showing the relationship between the flow rate of exhaust expelled from the engine and the flow rate of exhaust flowing into a bypass passage.
Figure 4:
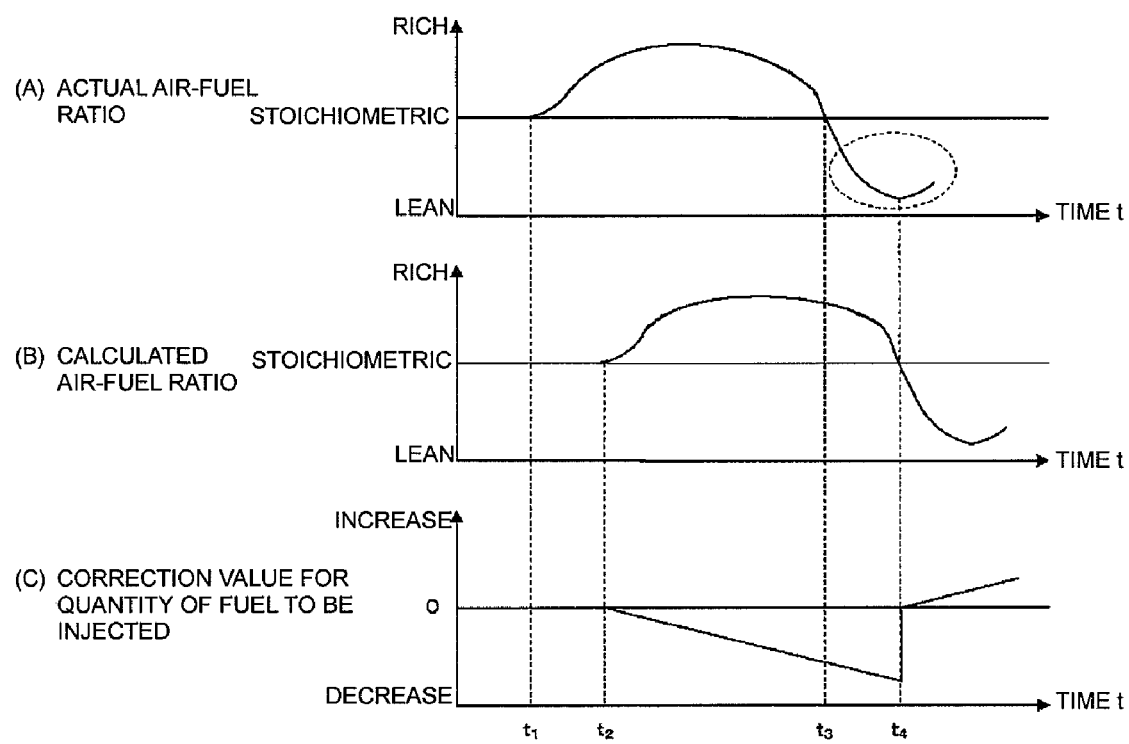
FIGS. 4A to 4C are time graphs illustrating a case in which the air-fuel ratio of the engine is controlled by a first air-fuel ratio sensor with degraded responsiveness.

However, once the switching valve 37 is fully open, most of the exhaust expelled from the engine 1 flows through the main passage 32, with a resulting decrease in the flow rate of exhaust flowing through the bypass passage 31. FIG. 3 shows the relationship between the flow rate Q of exhaust immediately after expulsion from the engine 1 and the flow rate q of exhaust flowing into the bypass passage 31 when the switching valve is fully open. As shown in FIG. 3, the bypass flow rate, i.e., the flow rate q of exhaust in the bypass passage 31, increases with the exhaust flow rate, i.e., total flow rate Q of exhaust immediately after expulsion from the engine 1. However, because the cross-sectional area of the bypass passage 31 is smaller than that of the main passage 32, the bypass flow rate q is lower than the exhaust flow rate Q. If the exhaust flow rate Q falls below a predetermined flow rate $Q_0$, consequently the bypass flow rate q falls below a predetermined decreased responsiveness threshold value $q_0$. When the bypass flow rate q is less than $q_0$, the responsiveness of the first air-fuel ratio sensor 36 is degrade (i.e., it decreases). Under these conditions, the air-fuel ratio calculated by the controller 40 will lag in time the actual air-fuel ratio, so that it will be difficult to accurately control the air-fuel ratio of the engine 1, and thus it will be more difficult to purify the engine exhaust.

FIGS. 4A to 4C illustrate the operation of an air-fuel ratio control device 100 when, after the switching valve 37 is opened, the air-fuel ratio of the engine 1 is controlled based on the first air-fuel ratio sensor 36 with degraded responsiveness. Specifically, FIG. 4A shows the actual air-fuel ratio of the engine 1, FIG. 4B shows the calculated air-fuel ratio obtained based on the value detected by the first air-fuel ratio sensor 36, and FIG. 4C shows a correction value determined by the controller 40 for adjusting the quantity of fuel to be injected. Since the responsiveness of the first sensor 36 is decreased, the air-fuel ratio calculated from the value detected by the first sensor 36 becomes rich starting at time $t_2$, as shown in FIG. 4B, even though the actual air-fuel ratio became rich starting at time $t_1$, as shown in FIG. 4A. As the calculated air-fuel ratio becomes richer after time $t_2$, a correction value is set so that the quantity of fuel to be injected becomes progressively smaller in an effort to achieve a stoichiometric air-fuel ratio, as shown in FIG. 4C.

The controller 40 corrects for a rich air-fuel ratio by decreasing the quantity of fuel to be injected so that the actual air-fuel ratio becomes equal to the stoichiometric value at time $t_3$. However, the calculated air-fuel ratio lags and does not become stoichiometric until time $t_4$, due to the delayed response of the first air-fuel ratio sensor 36. This lag causes the controller 40 to continue to decrease the quantity of fuel to be injected in attempt to control the air-fuel ratio to stoichiometric, even during the period from time $t_3$ to time $t_4$ when the air-fuel ratio has already become lean. As a result, the actual air-fuel ratio significantly overshoots to the lean side of stoichiometric, as shown in the area circled by the broken line in FIG. 4A. Overshooting and oscillation may continue as long as the first air-fuel control sensor 36 is operating with an exhaust flow rate q less than $q_0$.

As described above, while moisture is passing beyond the second air-fuel ratio sensor 39 after the switching valve 37 has opened, the conventional method controls the air-fuel ratio of the engine 1 based on the value detected by the first air-fuel ratio sensor 36 with degraded responsiveness. As a result, the controller 40 changes the air-fuel ratio of the engine 1 more than necessary, leading to deterioration a in exhaust purification.

To combat this deficiency in prior systems, the present embodiment incorporates the measures described below. After the switching valve 37 has opened but before the moisture in the lingering gas has passed beyond the second air-fuel ratio sensor 39, if the responsiveness of the first air-fuel ratio sensor 36 decreases or is degraded due to the diversion of exhaust flow from the bypass passage 31 to the main passage 32, a low response correction value is used to reduce the amount of adjustment (i.e., the control gain) applied to the quantity of fuel to be injected. The low response correction value is based on the exhaust flow rate Q. Decreasing the control gain decreases the rate of change to the air-fuel ratio of the engine 1, and hence reduces the deterioration of emission purification that could result from the low responsiveness of the first sensor 36.

Figure 5:
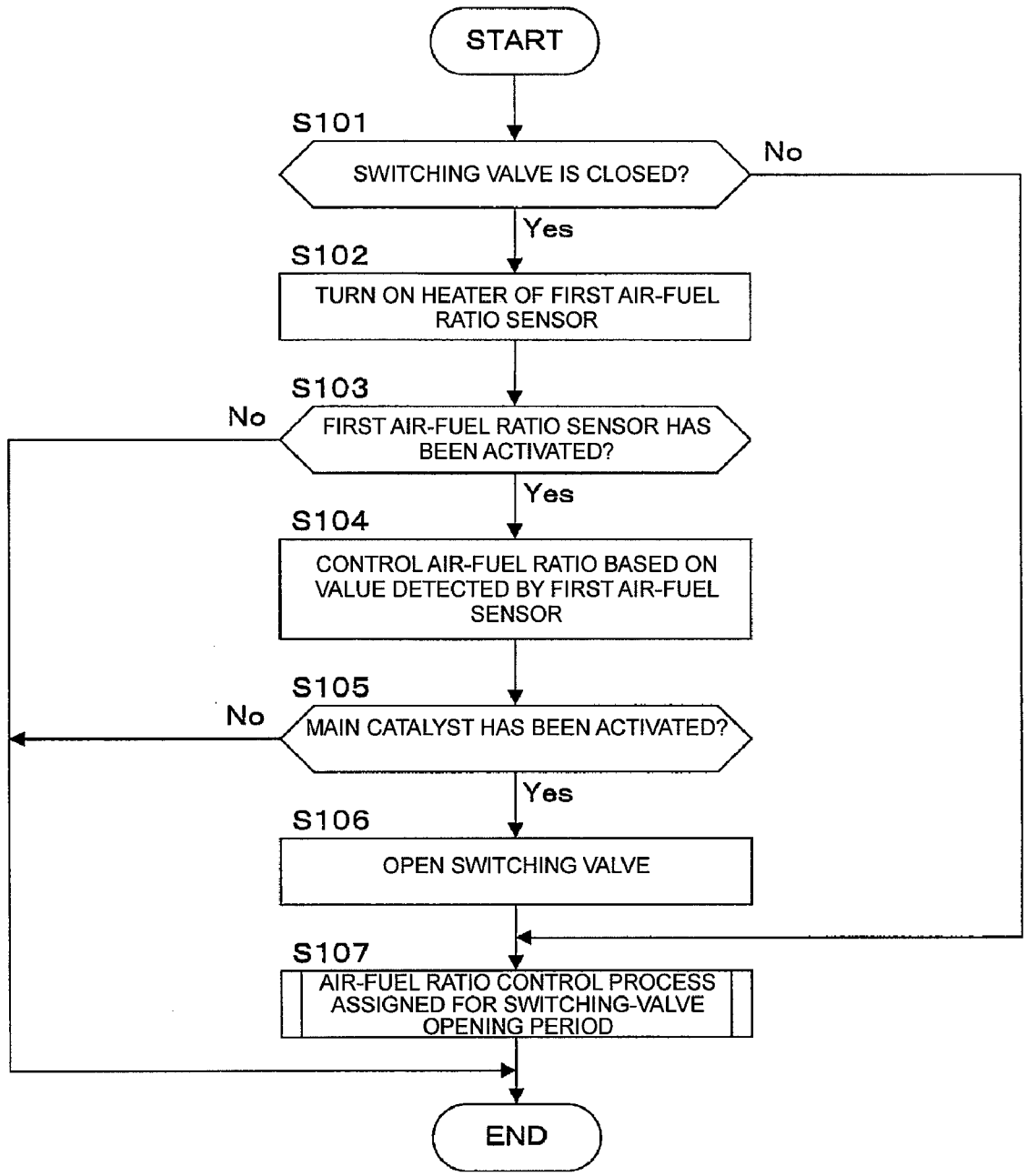
FIG. 5 is a flowchart illustrating a control process carried out by a controller.

FIG. 5 is a flowchart illustrating a control routine carried out by the controller 40 to suppress the rate of air-fuel ratio changes and hence deterioration of exhaust purification. The control routine runs continuously in fixed cycles (e.g., each cycle taking about 10 milliseconds to execute) and is initiated with the start of operation of the engine 1.

In step S101, the controller 40 determines whether or not the switching valve 37 has closed the main passage 32. If the switching valve 37 has closed the main passage 32, the routine proceeds to step S102. If the switching valve 37 has opened the main passage 32, the routine proceeds to step S107.

In step S102, the controller 40 applies a voltage to a heater for heating the sensor element of the first air-fuel ratio sensor 36, and then proceeds to step S103. The sensor element of the first air-fuel ratio sensor 36 is heated to the activating temperature, and the temperature of the sensor element is kept within a range of operating temperatures.

In step S103, the controller 40 determines whether or not the first air-fuel ratio sensor 36 has been activated. The activation determination is made based on the temperature of the sensor element of the first sensor 36. If the determination is made that the first sensor 36 has been activated, the routine proceeds to step S104, and if not, the routine temporarily ends.

In step S104, based on the value detected by the first air-fuel ratio sensor 36 disposed in the bypass passage 31, the controller 40 controls the air-fuel ratio of the engine 1. If the switching valve 37 has been closed, exhaust from the engine 1 flows in the bypass passage 31, and therefore, the first air-fuel ratio sensor 36 detects the oxygen concentration of exhaust flowing in the bypass passage 31. Based on this the value detected by the first sensor 36, the quantity of fuel to be injected by the fuel injection value 14 is adjusted, thereby controlling the air-fuel ratio of the engine 1. Specifically, if the air-fuel ratio of the engine 1 is determined to be lean, the quantity of fuel to be injected is adjusted to be larger, and if the air-fuel ratio of the engine 1 is determined to be rich, the quantity of fuel to be injected is adjusted to be smaller, so that the air-fuel ratio approaches stoichiometric. The routine then proceeds to step S105.

In step S105, based on the main catalyst temperature detected by the main catalyst temperature sensor 38a, the controller 40 determines whether the catalyst in the main catalytic converter 38 has been activated or not. Exhaust flowing through the bypass passage 31 is purified by the bypass catalyst 35 and flows into the main passage 32 at the downstream junction 34, and then through the main catalytic converter 38 disposed in the downstream area of the main passage 32. Consequently, the main catalytic converter 38 is gradually heated to the main catalyst activating temperature when the switching valve 37 is closed. If the main catalytic converter 38 is determined to have reached the activating temperature, the routine proceeds to step S106. If the main catalytic converter 38 is determined not to have reached the main catalyst activating temperature, the routine temporarily ends.

In step S106, the controller 40 controls the switching valve 37 so as to open the main passage 32, thereby switching the passage through which most of the exhaust from the engine 1 flows. Accordingly, most exhaust from the engine 1 flows through the main passage 32 and is purified by the main catalytic converter 38, which has a capacity larger than that the bypass catalytic converter 36 in the bypass passage 35. Step S106 initiates a switching-valve opening period during which the switching valve 37 moves from the closed position to the open position. The routine then proceeds to step S107.

Figure 6:
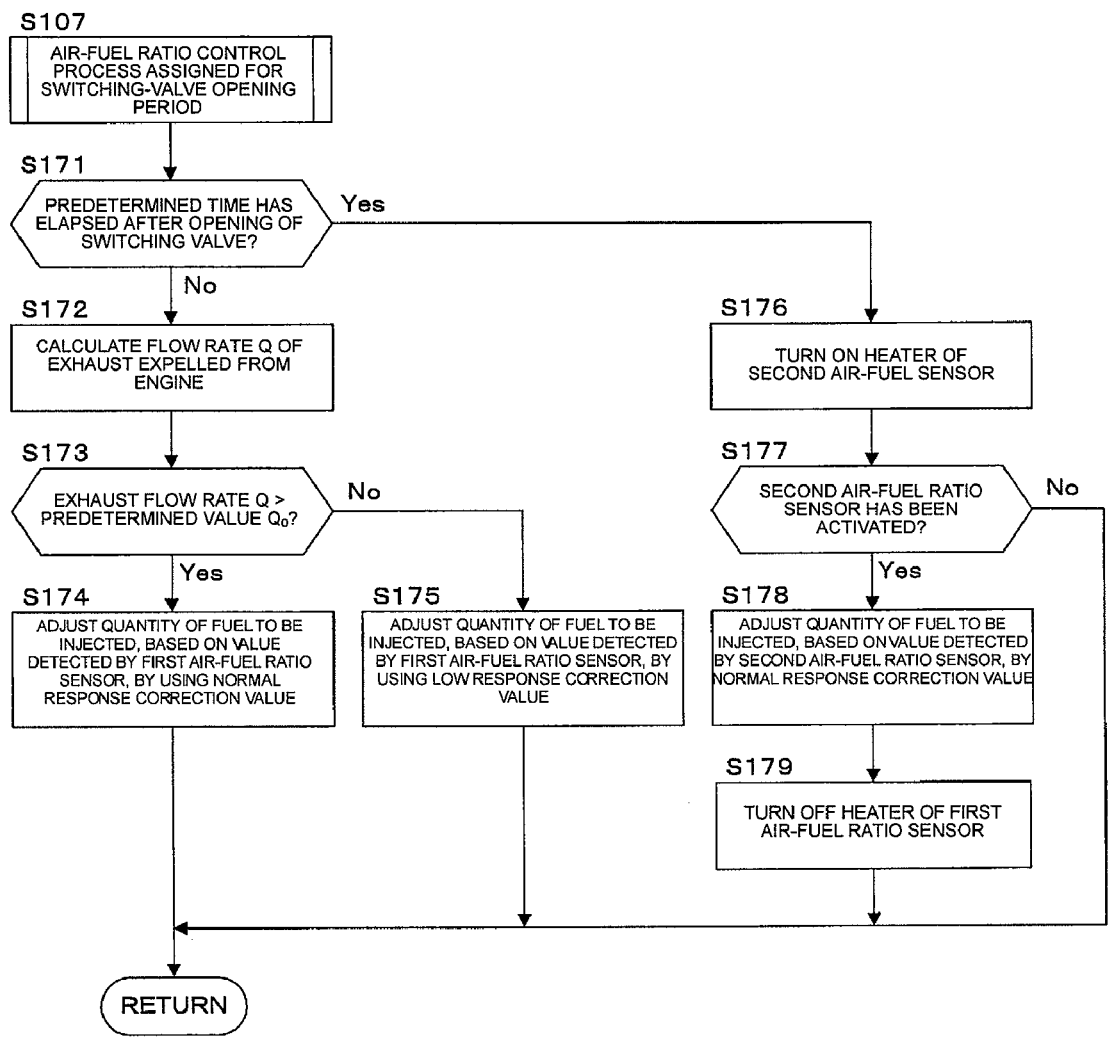
FIG. 6 is a flowchart illustrating an air-fuel ratio control process performed for the duration of a switching-valve open period.

In step S107, the controller 40 carries out an air-fuel ratio control process for the duration of the switching-valve opening period, and then terminates the routine. The air-fuel ratio control process for the duration of the switching-valve opening period will now be described in detail with reference to FIG. 6. FIG. 6 is a flowchart illustrating the air-fuel ratio control process which the controller 40 performs for the duration of the switching-valve opening period.

In step S171, the controller 40 determines whether or not a predetermined time has elapsed since the switching valve 37 opened the main passage 32. The predetermined time is regarded as the time when moisture in gas lingering upstream of the switching valve 37 could wet the second air-fuel ratio sensor 39 and crack or damage the sensor element. If the controller 40 determines that the predetermined time has not elapsed, the routine proceeds on the basis that moisture in any lingering gas remains upstream of the second air-fuel ratio sensor 39, and thus the routine proceeds to step S172 to control the air-fuel ratio of the engine 1 based on the value detected by the first air-fuel ratio sensor 36. If the controller 40 determines that the predetermined time has elapsed, the routine proceeds on the basis that moisture has passed beyond the second air-fuel ratio sensor 39, and thus the routine proceeds to step S176 to control the air-fuel ratio of the engine 1 based on the value detected by the second air-fuel ratio sensor 39.

In step S172, the controller 40 calculates the flow rate Q of exhaust expelled from the engine 1 and then proceeds to step S173. The exhaust flow rate Q can be calculated based on the rotational speed (i.e., revolutions per minute or RPMs) and load of the engine 1. Alternatively, an exhaust pressure sensor (not shown) may be disposed in the main passage 32 in the vicinity of the engine 1 to detect an exhaust pressure, and the exhaust flow rate Q can be calculated based on the exhaust pressure detected by the exhaust pressure sensor.

In step S173, the controller 40 determines whether or not the calculated exhaust flow rate Q is greater than the predetermined value $Q_0$. If the exhaust flow rate Q is greater than or equal to the predetermined value $Q_0$, then the bypass flow rate q equals or exceeds the decreased responsiveness threshold $q_0$. Accordingly, the controller 40 determines that the responsiveness of the first air-fuel ratio sensor 36 is not degraded, and the routine proceeds to step S174. If the exhaust flow rate Q is below the predetermined value $Q_0$, the bypass flow rate q is lower than the decreased responsiveness threshold $q_0$. Accordingly, the controller 40 determines that the responsiveness of the first air-fuel ratio sensor 36 has been degraded and will perform poorly, as shown in FIGS. 4A to 4C. The routine then proceeds to step S175.

In step S174, the controller 40 adjusts the quantity of fuel to be injected based on the value detected by the first air-fuel ratio sensor 36. Because the bypass flow rate q is equal to or greater than the responsiveness threshold $q_0$, the controller 40 applies a normal control gain to the signal from the first sensor 36 to calculate a normal response correction value. The normal response correction value is used to adjust the air-fuel ratio of the engine 1. As in the case of step S104, if the controller 40 determines the air-fuel ratio of the engine 1 to be lean, the quantity of fuel to be injected is increased, and if the controller 40 determines the air-fuel ratio of the engine to be rich, the quantity of fuel to be injected is decreased, so that the air-fuel ratio approaches stoichiometric.

In step 175, the controller 40 adjusts the quantity of fuel to be injected based on the value detected by the first air-fuel ratio sensor 36. Because the bypass flow rate q is less than the decreased responsiveness threshold $q_q$, indicating a low responsiveness of the first air-fuel ratio sensor 36, the controller 40 applies a low control gain to the signal from the first sensor 36 to calculate a low response correction value. The low response correction value is used to adjust the air-fuel ratio of the engine 1. The low response correction value is smaller than the normal response correction value (i.e., the control gain is smaller), such that the amount of adjustment applied to the quantity of fuel to be injected is less than the amount of adjustment that would be applied using the normal response correction value. By setting a smaller amount of adjustment when the first air-fuel ratio sensor 36 has a low responsiveness, the controller 40 is better able to adjust the air-fuel ratio of the engine 1 to achieve a stoichiometric mixture.

In step S176, once the predetermined time has elapsed since the switching valve 37 opened the main passage 32, i.e., once the switching valve opening time has elapsed, the controller 40 applies a voltage to a heater to heat the sensor element of the second air-fuel ratio sensor 39. Consequently, the sensor element of the second sensor 39 is heated to the activating temperature by the heater, and the temperature of the sensor element is kept within a range of operating temperatures. The routine then proceeds to step S177.

In step S177, the controller 40 determines whether the second air-fuel ratio sensor 39 has been activated or not. The activation determination can be based on the temperature of the sensor element of the second sensor 39. If the second sensor 39 has been activated, the controller 40 proceeds to step S178. If the sensor 39 has not been activated, the routine temporarily ends.

In step S178, the controller 40 adjusts the quantity of fuel to be injected based on the value detected by the second air-fuel ratio sensor 39 by applying a normal control gain to calculate a normal response correction value to adjust the air-fuel ratio of the engine 1. Using a normal response correction value when the second air-fuel ratio sensor 39 is activated, the controller 40 can achieve an air-fuel ratio of the engine 1 equal to the stoichiometric value. The routine then proceeds to step S179. In step S179, the controller 40 stops the application of voltage to the heater heating the first air-fuel ratio sensor 36, and terminates the routine.

Figure 7:
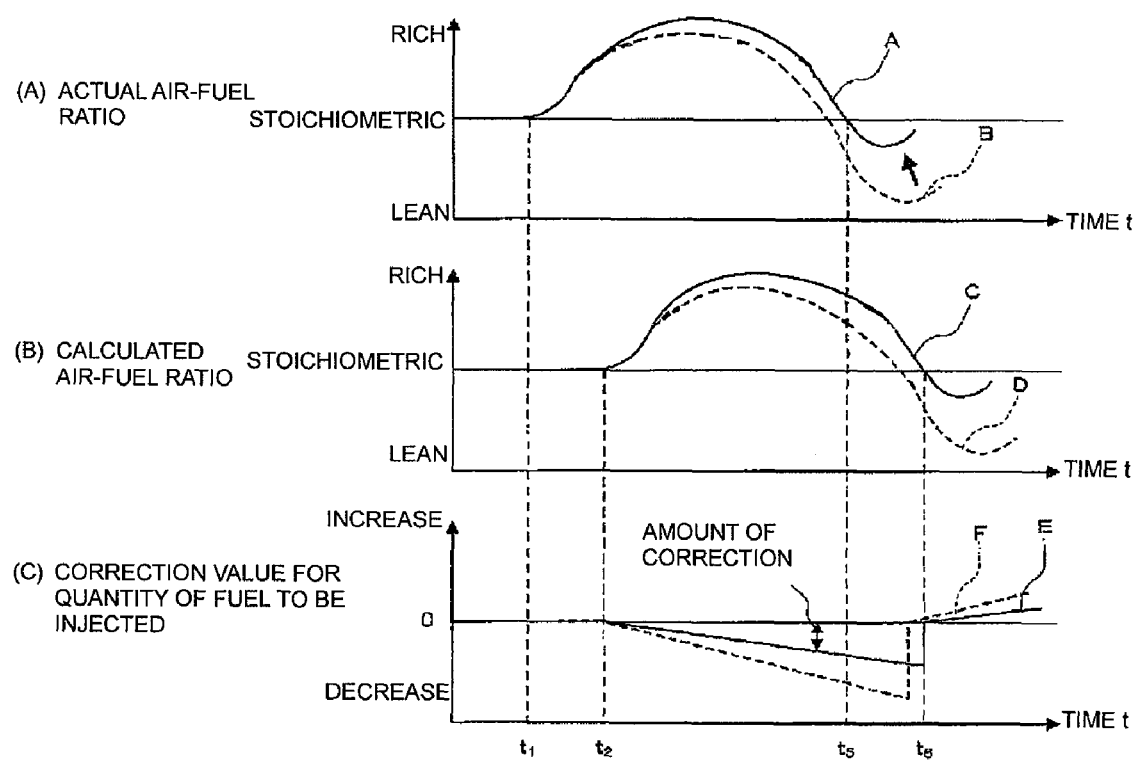
FIGS. 7A to 7C are time graphs illustrating a case in which the air-fuel ratio of the engine is controlled by a first air-fuel ratio sensor using a correction value assigned for a low response period to adjust the quantity of fuel to be injected.

FIGS. 7A to 7C are time graphs representing the air-fuel ratio of an engine 1 over time in the case in which the responsiveness of the first air-fuel ratio sensor 36 is low and thus a low response correction value is used to correct the quantity of fuel to be injected into the engine 1. The solid lines indicate the case in which the quantity of fuel to be injected is adjusted using the low response correction value. The broken lines indicate the case in which the quantity of fuel to be injected is adjusted using the normal response correction value (i.e., the case illustrated in FIGS. 4A to 4C).

When the responsiveness of the first air-fuel ratio sensor 36 is reduced from a normal responsiveness, the calculated air-fuel ratio obtained from a value detected by the first air-fuel ratio sensor 36 becomes rich starting at time $t_2$ (as indicated by the solid line C in FIG. 7B) while the actual air-fuel ratio became rich at time $t_1$ (as indicated by the solid line A in FIG. 7A). Thus, as before with reference to FIGS. 4A to 4C, there is a lag between $t_1$ and $t_2$ when the responsiveness of the first sensor 36 is degraded. (Note that the broken lines B, D, and F in FIGS. 7A, 7B, and 7C, respectively, correspond to the lines in FIGS. 4A, 4B, and 4C.) Since the calculated air-fuel ratio has become richer, the quantity of fuel to be injected is adjusted lower starting at time $t_2$. With reference to FIG. 7C, because the responsiveness of the first air-fuel ratio sensor 36 is low, the quantity of fuel to be injected is adjusted using the low response correction value (indicated by the solid line E), which causes a smaller amount of correction of the quantity of fuel to be injected than would otherwise be made using the normal response correction value (indicated by the broken line F).

When the quantity of fuel to be injected is adjusted using a low response correction value, the actual air-fuel ratio becomes equal to the stoichiometric value at time $t_5$ (as indicated by the solid line A in FIG. 7A), which is later that the time $t_3$ at which the actual air-fuel ratio became equal to the stoichiometric value when a normal response correction value was used (as indicated by the broken line B in FIG. 7A, corresponding to the line on FIG. 4A). Similarly, the calculated air-fuel ratio becomes equal to the stoichiometric value at time $t_6$ due to the delayed response of the first air-fuel ratio sensor 36 (as indicated by the solid line C in FIG. 7B), which is later than the time $t_4$ at which the calculated air-fuel ratio became equal to the stoichiometric value when a normal response correction was used (as indicated by the broken line D in FIG. 7B, corresponding to the line on FIG. 4B). As a result, the quantity of fuel to be injected is adjusted to decrease even during the period from time $t_5$ to time $t_6$ (as indicated by the solid line E in FIG. 7C). However, the quantity of fuel to be injected is corrected using the low response correction value (indicated by solid line E in FIG. 7C), which is smaller than the amount of adjustment that would have been made to the quantity of fuel to be injected using a normal response correction value (indicated by broken line F in FIG. 7C, corresponding to the line on FIG. 4C). Accordingly, even though the actual air-fuel ratio becomes lean after time $t_5$ as indicated by the solid line A, the actual air-fuel ratio becomes less lean than the actual air-fuel ratio when the quantity of fuel to be injected is adjusted using the normal response correction value, i.e., the overshoot is decreased. The difference in overshoot is indicated by the arrow between the broken line B and the solid line A in FIG. 7A.

Accordingly, the first embodiment of the air-fuel ratio control device operates as follows during the switching valve opening period. Immediately after the switching valve 37 has opened, the predetermined time has not elapsed, so step S171 results in "no" and the exhaust flow rate Q is calculated in step S172. If the exhaust flow rate Q is greater than the predetermined value $Q_0$, step S172 results in "yes" and in step S174, the air-fuel ratio is controlled by adjusting the quantity of fuel provided to the engine 1 using a normal response correction value based on a signal from the first air-fuel ratio sensor 36. However, if the exhaust flow Q is less than the predetermined value $Q_0$, step S172 results in "no" and in step S175, the air-fuel ratio is controlled by adjusting the quantity of fuel provided to the engine 1 using a low response correction value based on a signal from the first air-fuel ratio sensor 36. The low response correction value reduces the rate of change to the air-fuel ratio of the engine 1 when the responsiveness of the first air-fuel ratio sensor 36 is low, thus suppressing a deterioration in exhaust purification.

After the predetermined time has elapsed since the switching valve 37 opened, step S171 results in "yes," and in step S176, the sensor element of the second air-fuel ratio sensor 39 is heated to the activating temperature. Once the second air-fuel ratio sensor 39 has reached the activating temperature in step S177, the air-fuel ratio is controlled in step S178 by adjusting the quantity of fuel provided to the engine 1 using a normal response correction value based on a signal from the second air-fuel ratio sensor 39. By waiting to activate the second air-fuel ratio sensor 39 until after the predetermined time has elapsed, the moisture from the gas lingering behind the switching valve 37 is prevented from suddenly cooling and damaging the second sensor 39.

A second embodiment of the air-fuel ratio control device is described with reference to FIGS. 8 to 10. The configuration of an air-fuel ratio control device 100 according to the second embodiment is substantially identical to that in the first embodiment, except that the operation of the switching valve 37 differs in some respects. In particular, in the second embodiment, the degree of opening of the switching valve 37 is controlled based on the flow rate Q of exhaust expelled from the engine 1. The following description highlights the differences between the second and first embodiments, and avoids unnecessarily repeating aspects of the device 100 that are the same.

As described in the first embodiment, if the bypass flow rate q falls below the decreased responsiveness threshold $q_0$ after the switching valve 37 has opened the main passage 32, the responsiveness of the first air-fuel ratio sensor 36 decreases. In the first embodiment, to prevent deterioration of exhaust purification when the responsiveness of the first sensor 36 is low, the quantity of fuel to be injected is adjusted using a low response correction value. In contrast, in the second embodiment, the degree of opening of the switching valve is controlled to maintain the bypass flow rate q greater than or equal to the decreased responsiveness threshold $q_0$, thus avoiding a condition of low responsiveness of the first sensor 36 and hence preventing a decrease in exhaust purification. As a result, the quantity of fuel to be injected can be adjusted using a normal response correction value.

Figure 8:
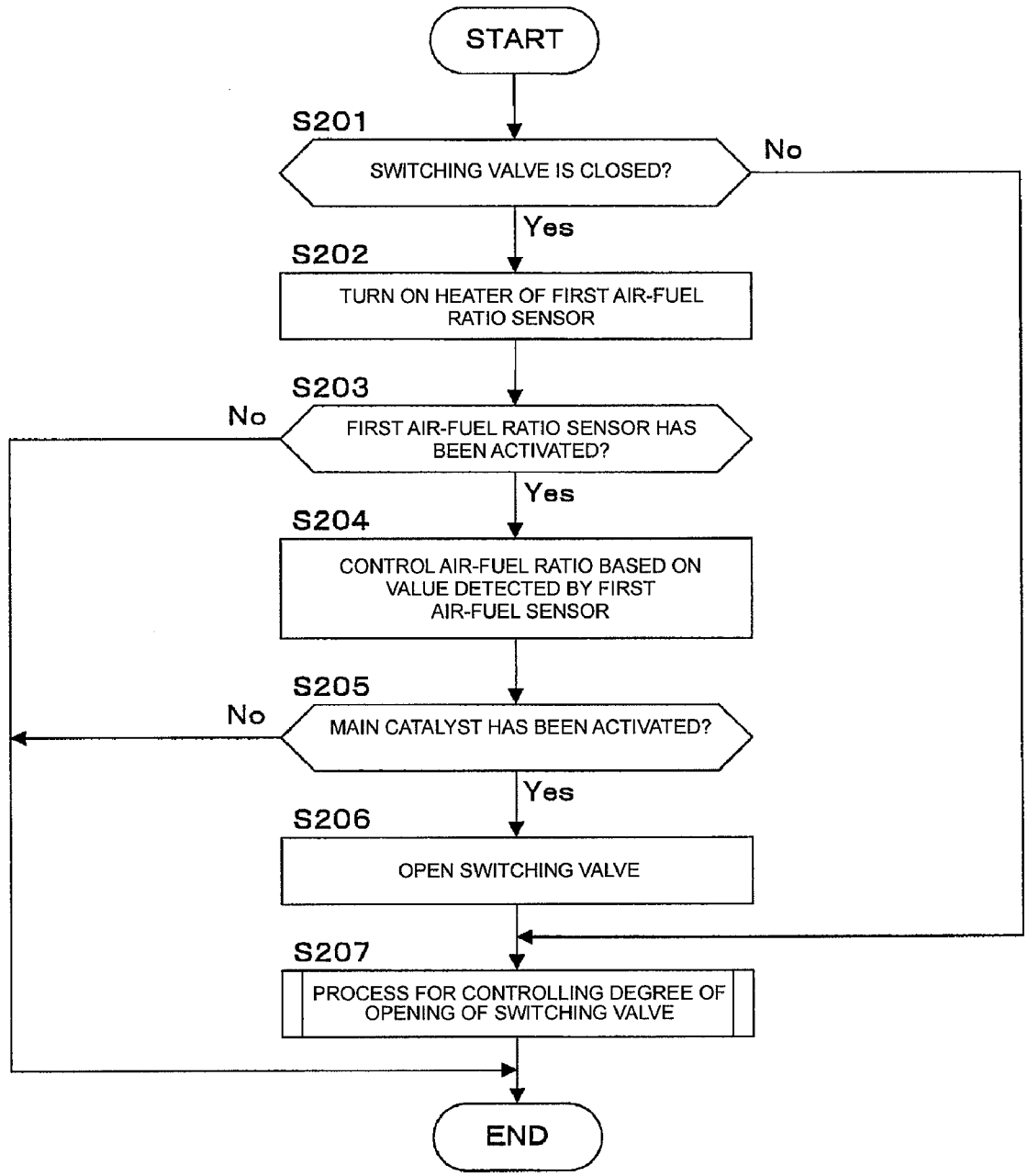
FIG. 8 is a flowchart illustrating a control process carried out by the controller.

FIG. 8 is a flowchart illustrating a control routine carried out by the controller 40 to control the air-fuel ratio of the engine 1. This control routine runs continuously in fixed cycles (e.g., each cycle taking 10 milliseconds to execute) and is initiated with the start of the operation of the engine 1. The control process in steps S201 to S206 is identical to that in corresponding steps S101 to S106 of the first embodiment, and explanation thereof is omitted.

If it is determined in step S205 that the main catalytic converter 38 has reached the activating temperature ("yes"), the switching valve 37 is controlled in step 206 to open the main passage 32. In step S207, the controller 40 controls the degree of opening of the switching valve 37, and terminates the routine.

Figure 9:
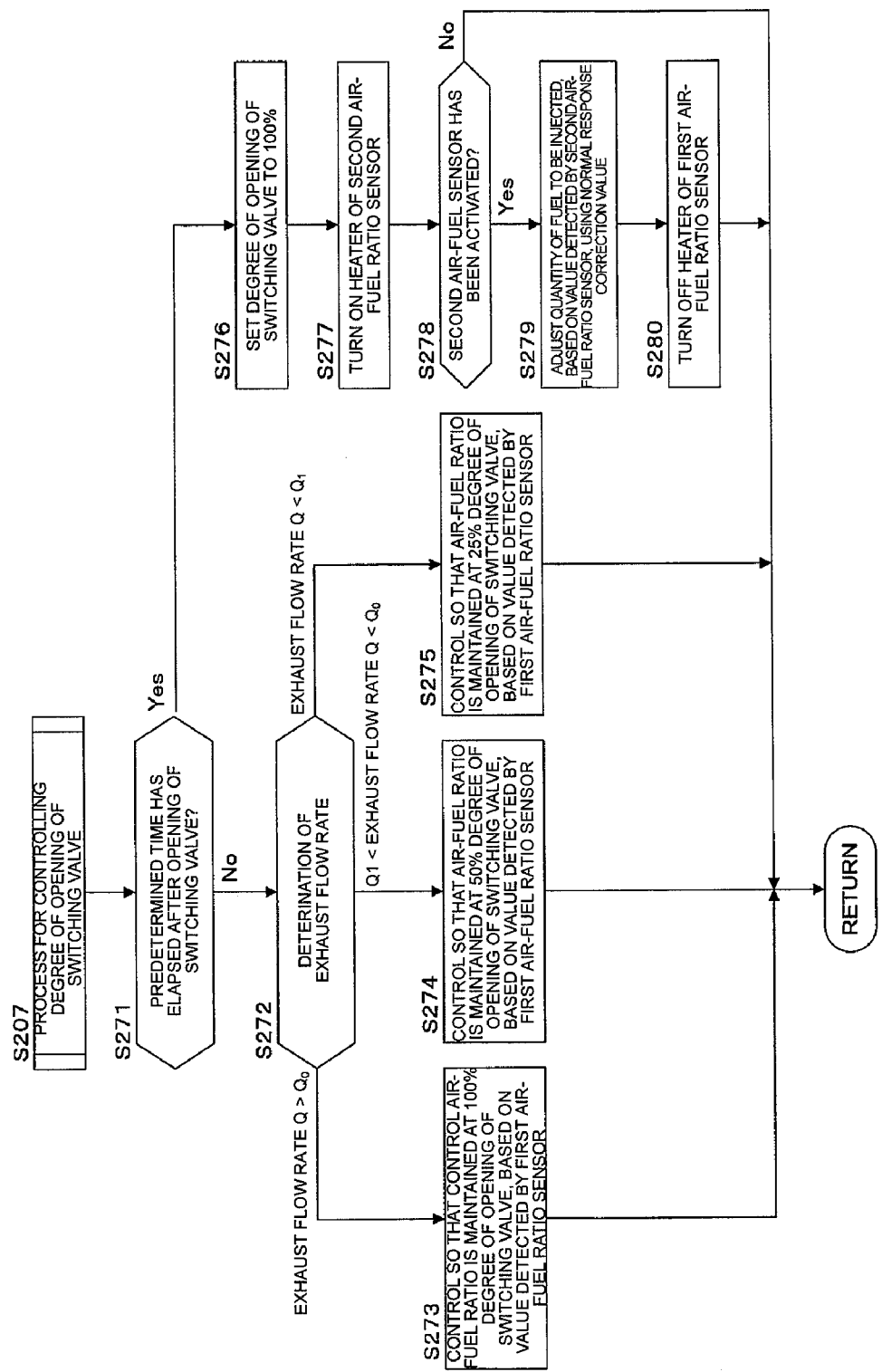
FIG. 9 is a flowchart illustrating a process of controlling the degree of opening of a switching valve.
Figure 10:
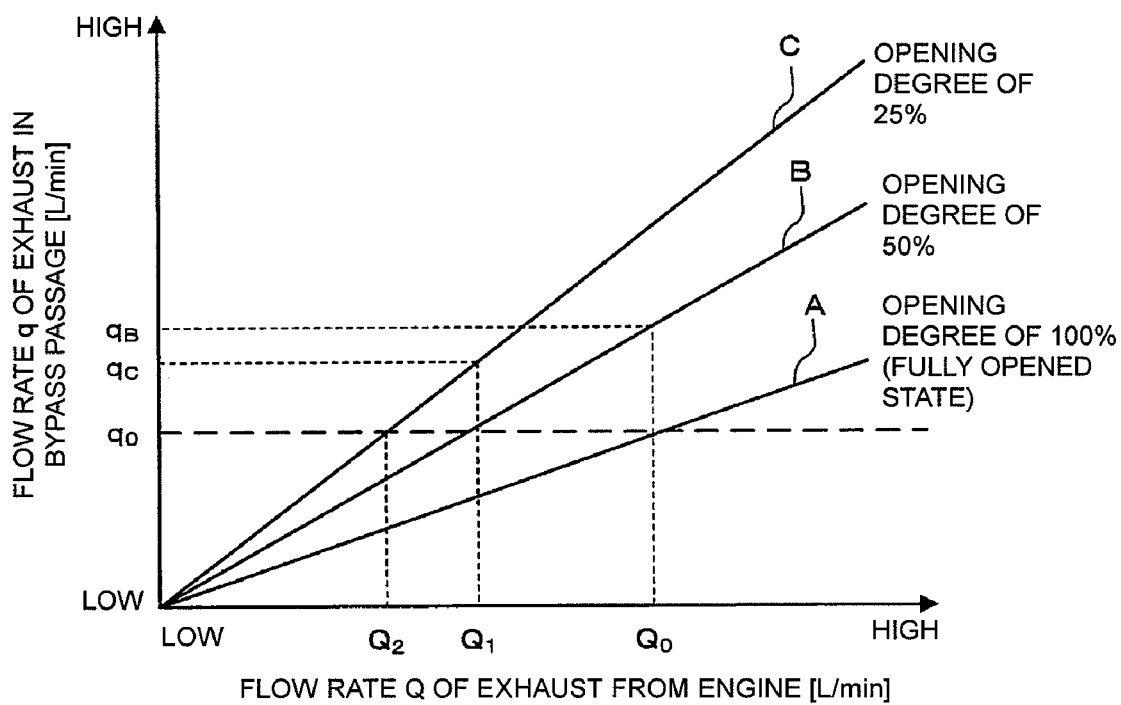
FIG. 10 is a graph showing the relationship between the flow rate of exhaust expelled from the engine and the flow rate of exhaust in the bypass passage.

FIG. 9 depicts the process whereby the controller 40 controls the degree of opening of the switching valve 37. In step S271, the controller 40 determines whether or not a predetermined time has elapsed since the switching valve 37 has opened the main passage 32. The predetermined time is regarded as the time during which the moisture in gas lingering upstream of the switching valve 37 could wet the second air-fuel ratio sensor 39 and crack or damage the sensor element. If the controller 40 determines that the predetermined time has not elapsed, the routine proceeds on the basis that moisture in the lingering gas remains upstream of the second air-fuel ratio sensor 39, and thus the routine proceeds to step S272 in order to control the air-fuel ratio of the engine 1 based on the value detected by the first air-fuel ratio sensor 36 located in the bypass passage 31. If the controller 40 determines that the predetermined time has elapsed, the routine proceeds on the basis that moisture has passed the second air-fuel ratio sensor 39, and thus the routine proceeds to step S276 in order to control the air-fuel ratio of the engine 1 based on the value detected by the second air-fuel ratio sensor 39.

In step 272, the controller 40 calculates the flow rate of exhaust expelled from the engine 1 from the rotational speed and load of the engine 1. Based on the exhaust flow rate Q, the controller 40 determines the degree of opening of the switching valve 37. In particular, the controller 40 determines which one of the following formulae is satisfied by the exhaust flow rate Q:

$Q > Q_0$, wherein Q is the flow rate of exhaust expelled from the engine 1 and $Q_0$ is a first predetermined value; (1):

$Q_1 < Q < Q_0$, wherein Q is the flow rate of exhaust expelled from the engine 1, $Q_0$ is the first predetermined value, and $Q_1$ is a second predetermined value; and (2):

$Q < Q_1$, wherein Q is the flow rate of exhaust expelled from the engine 1 and $Q_1$ is the second predetermined value. (2):

If the exhaust flow rate Q is greater than the first predetermined value $Q_0$, and thus satisfies formula (1), the routine proceeds to step S273. If the exhaust flow rate Q is less than the first predetermined value $Q_0$ but greater than the second predetermined value $Q_1$, and thus satisfies formula (2), the routine proceeds to step S274. If the exhaust flow rate Q is less than the second predetermined value $Q_1$, and thus satisfies formula (3), the flow proceeds to step S275.

In step S273, the controller 40 controls the switching valve 37 so that its degree of opening is 100% (i.e., fully opened). Based on the value detected by the first air-fuel ratio sensor 36, the controller 40 adjusts the quantity of fuel to be injected using the normal response correction value, thereby adjusting the air-fuel ratio. Because the exhaust flow rate satisfies $Q > Q_0$, the bypass flow rate q is greater than the decreased responsiveness threshold $q_0$ even when the switching valve 37 is fully opened. Accordingly, the responsiveness of the first air-fuel ratio sensor 36 does not decrease or degrade.

In step S274, the controller 40 controls the switching valve 37 so that the degree of opening of the switching valve is set at about 50%. Based on the value detected by the first air-fuel ratio sensor 36, the controller 40 adjusts the quantity of fuel to be injected using the normal response correction value, thereby adjusting the air-fuel ratio. If the switching valve 37 were to be fully opened when the exhaust flow rate Q satisfies $Q_1 < Q < Q_0$, the bypass flow rate q would fall below the decreased responsiveness threshold $q_0$, resulting in a decreased responsiveness of the first sensor 36. However, when the degree of opening of the switching valve 37 is set at about 50%, proportionally more exhaust flows through the bypass passage 31 to maintain a normal responsiveness of the first sensor 36.

In step S275, the controller 40 controls the switching valve 37 so that the degree of opening of the switching valve 37 is set at about 25%. Based on the value detected by the first air-fuel ratio sensor 36, the controller 40 adjusts the quantity of fuel to be injected using a normal response correction value, thereby adjusting the air-fuel ratio. If switching valve were to be opened to about 50% when the exhaust flow rate satisfies $Q < Q_1$, the bypass flow rate q would fall below the decreased responsiveness threshold $q_0$, resulting in a decreased responsiveness of the first sensor 36. However, when the degree of opening of the switching valve 37 is set at about 25%, exhaust is allowed to flow more easily into the bypass passage 31 than when the switching valve 37 is set to a the degree of opening of about 50% to maintain a normal responsiveness of the first sensor 36.

The degrees of opening of the switching valve 37 in steps S274 and S275 are exemplary only. It is understood by one skilled in the art that the degree of opening of the switching valve 37 when $Q_1 < Q < Q_0$ need not be 50% but can be set at any value less than 100% to ensure that the exhaust flow rate q in the bypass passage 31 approaches or exceeds the decreased responsiveness threshold $q_0$. Similarly, the degree of opening of the switching valve 37 when $Q<Q_1$ need not be 25% but can be set at any value less than the value used when $Q_1<Q<Q_0$ to ensure that the bypass flow rate q approaches or exceeds $q_0$.

If it is determined in step S271 that a predetermined time has elapsed since the switching valve 37 opened, the controller 40 sets the degree of opening of the switching valve to 100% (i.e., fully opened) in step S276, and then proceeds to step S277. The control routine in steps S277 to S280 is identical to that in corresponding steps S176 to 179 of the first embodiment, and explanation thereof is omitted.

The control obtained setting the degree of opening of the switching valve 37 is described with reference to FIG. 10, which shows the relationship between the flow rate Q of exhaust expelled from the engine 1 and the exhaust flow rate q in the bypass passage 31.

When the engine 1 is running at a high speed or under a high load, and the exhaust flow rate Q is therefore greater than $Q_0$, the bypass flow rate q exceeds the decreased responsiveness threshold $q_0$, even if the degree of opening of the switching valve is set to 100% (i.e., fully opened state). This condition is indicated by solid line A. Accordingly, since there is no decrease in the responsiveness of the first air-fuel ratio sensor 36, the air-fuel ratio of the engine 1 can be controlled by using a normal response correction value based on the signal from the first sensor 36.

When the engine 1 is running at an intermediate speed or under an intermediate load, and the exhaust flow rate Q is therefore less than $Q_1$ but great than $Q_0$, the bypass flow rate q falls below the decreased responsiveness threshold $q_0$ if the switching valve 37 is fully opened, as indicated by the solid line A. In order to maintain the bypass flow rate q above $q_0$ when the exhaust flow rate is $Q_1<Q<Q_0$, the degree of opening of the switching valve 37 is set to about 50%. (It is understood that a 50% opening is exemplary, and a degree of opening different from 50% can be used, if required, to maintain $q \geq q_0$.) Thus, the portion of the exhaust flow rate Q directed to the bypass passage 31 is increased, and the bypass flow rate q is maintained above the decreased responsiveness threshold $q_0$, as indicated by the solid line B. As a result, the responsiveness of the first sensor 36 is not degraded and a normal response correction value can be used.

When the engine 1 is running in an idle state and the exhaust flow rate Q is therefore less than $Q_1$, the bypass flow rate q falls below the decreased responsiveness threshold $q_0$, as indicated by the solid line B, even if the degree of opening of the switching valve 37 is set to about 50%. In order to maintain the bypass flow rate q above $q_0$ when the exhaust flow rate is $Q<Q_1$, the degree of opening of the switching valve 37 is set to about 25%. (It is understood that a 25% opening is exemplary, and a degree of opening different from 25% can be used, if required, to maintain $q \geq q_0$.) Thus, the portion of the exhaust flow rate Q directed to the bypass passage 31 is increased, and the bypass flow rate q is maintained above the decreased responsiveness threshold $q_0$, as indicated by the solid line C. As a result, the responsiveness of the first air-fuel ratio sensor 36 is not degraded and a normal response correction value can be used. Incidentally, when the engine 1 is idling and the flow rate of exhaust from the engine 1 is at its lowest, the exhaust flow rate Q does not fall below $Q_2$, as shown in FIG. 10, and hence, the bypass flow rate q does not fall below the decreased responsiveness threshold $q_0$ as long as the switching valve is open by at least 25%.

Accordingly, an air-fuel ratio control device 100 according to the second embodiment yields the advantageous effects described below. Following the opening of the switching valve 37 but before switching from the first air-fuel ratio sensor 36 to the second air-fuel ratio sensor 39, the degree of opening of the switching valve 37 is controlled based on the exhaust flow rate Q. Thus, the exhaust flow rate q in the bypass passage 31 can be maintained in excess of the decreased responsiveness threshold $q_0$, and consequently a decrease in the responsiveness of the first air-fuel ratio sensor 36 can be avoided. This minimizes changes in the air-fuel ratio of the engine 1, thus restraining the degradation in exhaust purification during the switching valve opening period.

In addition, when the exhaust flow rate Q becomes higher, control is exerted so as to open the switching valve 37. This prevents an excessive increase in the pressure of exhaust in the main passage 32, which might otherwise result from an increase in the exhaust flow rate Q. By preventing excessive exhaust back-pressure to the engine 1, higher efficiency in injecting intake air into the engine 1 can be achieved. Further, controlling the air-fuel ratio of the engine 1 by switching from the first air-fuel ratio sensor 36 to the second air-fuel ratio sensor 39 after the elapse of a predetermined time following the opening of the switching valve 37 prevents cracking of the sensor element of the second air-fuel ratio sensor 39, as in the first embodiment.

It should be understood that the present invention is not limited to the foregoing embodiments and that various changes and modifications may be made without departing from the spirit and scope of the invention. For example, the first embodiment controls the air-fuel ratio of the engine 1 by adjusting the quantity of fuel to be injected. However, the device 100 may control the air-fuel ratio by adjusting the quantity of intake air to the engine 1. In particular, if the responsiveness of the first air-fuel ratio sensor 36 degrades after the switching valve 37 opens, the quantity of intake air is adjusted by a low response correction value, which is smaller than the amount of correction (i.e., correction gain) in the quantity of intake air than would be applied if a normal response correction value were used. Thus, when the responsiveness of the first air-fuel ratio sensor 36 is low, the control gain (i.e., the amount of correction) applied to inputs controlling the air-fuel ratio of the engine 1 is low compared to the control gain assigned for a normal response condition. The inputs for controlling the air-fuel ratio include, but are not limited to, the quantity of fuel to be injected and the quantity of intake air. Accordingly, exhaust purification does not degrade.

In the first embodiment, if the exhaust flow rate Q is lower than $Q_0$, the quantity of fuel to be injected is adjusted based on a low response correction value, which is smaller than the amount of correction (i.e., control gain) in the quantity of fuel to be injected than would be applied if a normal response correction value were used. However, the correction value may be set so that the amount of correction (i.e., control gain) of the quantity of fuel to be injected is varied according to the exhaust flow rate Q. This further minimizes air-fuel ratio changes in the engine 1 and further restrains degradation of exhaust purification.

The second embodiment sets the degree of opening of the switching valve 37 based on the formulae (1) to (3), but is not limited thereto. Instead, degradation of exhaust purification may be restrained by continuously varying the degree of opening of the switching valve according to the exhaust flow rate Q, thereby preventing a decrease in the responsiveness of the first air-fuel ratio sensor 36.

Additionally, in the second embodiment, degradation in exhaust purification may be restrained by decreasing the degree of opening of the switching valve 37 only when the engine 1 is idling, during which the exhaust flow rate Q is lowest.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. An air-fuel ratio control device for controlling an air-fuel ratio of an engine, comprising:
    an exhaust passage for conveying exhaust flow in a downstream direction away from the engine;
    a bypass passage diverging from the exhaust passage at an upstream junction and rejoining the exhaust passage at a downstream junction located downstream from the upstream junction;
    a bypass catalytic converter disposed in the bypass passage;
    a main catalytic converter disposed in the exhaust passage downstream from the downstream junction;
    a valve mechanism disposed in the exhaust passage between the upstream junction and the downstream junction, the valve mechanism moving between a closed state and an open state; and
    a first air-fuel ratio sensor disposed in the bypass passage;
    a second air-fuel ratio sensor disposed in the exhaust passage downstream of the valve mechanism;
    a controller configured to control the air-fuel ratio such that:
        during a closed period of the valve mechanism, the air-fuel ratio is controlled based on a signal from the first air-fuel ratio sensor;
        during an open period of the valve mechanism, the air-fuel ratio is controlled based on one of a signal from the first air-fuel ratio sensor and a signal from the second air-fuel ratio sensor; and
        when the air-fuel ratio is controlled based on a signal from the first air-fuel ratio sensor during the open period of the valve mechanism, the controller makes an amount of adjustment less than would be made based on the same signal from the first air-fuel ratio sensor during the closed period of the valve mechanism.

2. An air-fuel ratio control device according to claim 1, wherein the controller is configured to control the air-fuel ratio based on a signal from the first air-fuel ratio sensor during a predetermined period after the valve mechanism switches from the closed state to the open state.

3. An air-fuel ratio control device according to claim 2, the exhaust flow having a flow rate, wherein the controller is configured such that when the exhaust flow rate falls below a predetermined value, the controller decreases a control gain set during the closed period of the valve mechanism.

4. An air-fuel ratio control device according to claim 2, the exhaust flow having a flow rate, wherein the controller is configured such that as the exhaust flow rate decreases, the controller decreases a control gain set during the closed period of the valve mechanism.

5. An air-fuel ratio control device according to claim 2, wherein the engine has a speed and a loading, and wherein the controller is configured to calculate a flow rate of exhaust from the engine from the speed and the loading of the engine.

6. An air-fuel ratio control device according to claim 2, wherein the controller is configured such that after the predetermined period has elapsed since the switching of the valve mechanism from the closed state to the open state, the controller switches from basing control of the air-fuel ratio on a signal from the first air-fuel sensor to basing control of the air-fuel ratio on a signal from the second air-fuel sensor.

7. An air-fuel ratio control device according to claim 2, wherein the predetermined period is the time taken for exhaust lingering in the exhaust passage between the upstream junction and the valve mechanism to pass beyond the second air-fuel ratio sensor during the closed period of the valve mechanism.

8. A method for controlling an air-fuel ratio of an engine, comprising:
    apportioning exhaust flow from the engine between an exhaust passage and a bypass passage using a valve mechanism moving between a closed state and an open state, the valve mechanism being disposed between an upstream junction and a downstream junction in the exhaust passage, the bypass passage diverging from the exhaust passage at the upstream junction and rejoining the exhaust passage at the downstream junction;
    controlling the air-fuel ratio based on a signal from a first air-fuel sensor disposed in the bypass passage, during a closed period of the valve mechanism when at least most of the exhaust flow is directed through a bypass catalytic converter disposed in the bypass passage;
    controlling the air-fuel ratio based on one of a signal from the first air-fuel sensor and a signal from a second air-fuel sensor disposed in the exhaust passage downstream of the valve mechanism, during an open period of the valve mechanism when at least most of the exhaust flow is permitted through the exhaust passage, the exhaust flow flowing through a main catalytic converter disposed in the exhaust passage downstream of the downstream junction; and
    making an amount of adjustment when the air-fuel ratio is controlled based on a signal from the first air-fuel sensor during the open period of the valve mechanism less than would be made based on the same signal from the first air-fuel ratio sensor during the closed period of the valve mechanism.

9. The method of claim 8, further comprising controlling the air-fuel ratio based on a signal from the first air-fuel sensor during a predetermined period after the valve mechanism switches from the closed state to the open state.

10. The method of claim 9, further comprising decreasing a control gain set during the closed period of the valve mechanism when the rate of exhaust flow falls below a predetermined value.

11. The method of claim 9, further comprising decreasing a control gain set during the closed period of the valve mechanism when the rate of exhaust flow decreases.

* * * * *